United States Patent [19]

Lyle et al.

[11] Patent Number: 4,780,857
[45] Date of Patent: Oct. 25, 1988

[54] METHOD FOR LOGGING THE CHARACTERISTICS OF MATERIALS FORMING THE WALLS OF A BOREHOLE

[75] Inventors: W. D. Lyle, Grapevine; F. F. Osborn, Dallas; Joseph Zemanek, Ducanville, all of Tex.

[73] Assignee: Mobil Oil Corporation, New York, N.Y.

[21] Appl. No.: 127,325

[22] Filed: Dec. 2, 1987

[51] Int. Cl.⁴ .............................................. G01V 1/40
[52] U.S. Cl. ...................................... 367/35; 364/422
[58] Field of Search ................. 367/25, 28, 29, 33, 367/35, 69; 364/422; 33/304

[56] References Cited

U.S. PATENT DOCUMENTS

| | | | |
|---|---|---|---|
| 3,369,626 | 2/1968 | Zemanek, Jr. | 181/0.5 |
| 3,371,313 | 2/1968 | Zemanek, Jr. | 340/860 |
| 3,434,568 | 3/1969 | Caldwell | 181/0.5 |
| 3,478,839 | 11/1969 | Zemanek, Jr. | 181/0.5 |
| 3,550,075 | 12/1970 | Hilchie et al. | 367/28 |
| 3,553,640 | 1/1971 | Zemanek, Jr. | 367/27 |
| 3,668,619 | 6/1972 | Dennis | 367/69 |
| 3,718,204 | 2/1973 | Groenendyke | 181/0.5 |
| 3,728,672 | 4/1973 | Dennis et al. | 367/69 |
| 4,542,488 | 9/1985 | Clishem et al. | 367/35 |

OTHER PUBLICATIONS

"Formation Evaluation by Inspection with the Borehole Televiewer", J. Zemanek et al, Geophysics, vol. 35, No. 2 (Apr. 1970), pp. 254–269.

"The Borehole Televiewer-A New Logging Concept for Fracture Location and Other Types of Borehole Inspection," J. Zemanek et al, Journal of Petroleum Technology, pp. 762–774.

Primary Examiner—Nelson Moskowitz
Assistant Examiner—Ian J. Lobo
Attorney, Agent, or Firm—Alexander J. McKillop; Michael G. Gilman; George W. Hager, Jr.

[57] ABSTRACT

A borehole logging tool is rotated within a borehole and also advanced along the borehole. A log of the formations surrounding the borehole is recorded. An interval of the borehole intersected by a formation fracture is identified on the recorded log. The fracture dip angle and dip direction are determined from the location of the center of the fracture with respect to the borehole and the peak amplitude and phase angle of the recorded borehole signal at the fracture location.

6 Claims, 8 Drawing Sheets

METHOD FOR LOGGING THE CHARACTERISTICS OF MATERIALS FORMING THE WALLS OF A BOREHOLE

BACKGROUND OF THE INVENTION

This invention relates to acoustic logging of boreholes and, more particularly, to a method for determining the characteristics of the material forming the walls of the boreholes by logging the walls of the boreholes.

In U.S. Pat. Nos. 3,668,619 to Dennis; 3,369,626 to Zemanek, Jr.; 3,718,204 to Groenendyke; and 3,728,672 to Dennis et al, there are disclosed methods of and apparatus for scanning the walls of a borehole with acoustic energy. In these patents a borehole televiewer logging tool employs a transmitter and a receiver of acoustic energy which are rotated within the borehole. The transmitter is cyclically energized to provide a beam of acoustic energy pulses for scanning the walls of the borehole. Reflected acoustic pulses are received by the receiver between transmitted acoustic pulses and are converted to reflection signals for recording on an electron beam display device. A sweep signal is generated each time the acoustic energy beam is rotated through a 360° scanning pattern. Such sweep signal is applied to the horizontal deflection plates of the display device to sweep an electron beam horizontally across the face of the display device. The reflection signals are applied to the Z-axis of the display device to intensity modulate the electron beam as the beam is swept across the face of the display device to provide a picture which is a function of the time or distance from the transmitter and receiver to the wall of the borehole and of the density of the borehole wall.

In both the above-described patents the combination of transducer rotation along with vertical movement of the borehole televiewer logging tool along the length of the borehole results in a continuous spiral of the borehole wall being scanned. The resulting display is a picture of the density of the material forming the walls of the borehole at different depth points.

This scanning of the borehole wall permits the determination of the actual configuration of the borehole. In addition, it permits the determination of anomalies which may exist at different depths in the borehole. For example, these anomalies may be a fault or a fracture in the formations traversed by the borehole.

SUMMARY OF THE INVENTION

The present invention is directed to a method for determining the dip and direction of a formation fracture intersecting a borehole.

A survey is conducted of the formation's density surrounding a borehole. A borehole log is recorded of the data obtained during the survey. An interval of the borehole intersected by a formation fracture is identified from the borehole log.

The location Y of the center of the fracture relative to the borehole and the peak amplitude A and phase angle α of the recorded data at the fracture location are determined as follows:

(i) initial estimates of the values for Y, A and α are estimated, (ii) the initial values for Y, A and α are used to start an iteration using the following algorithm:

$$\begin{bmatrix} Y_{j+1} \\ A_{j+1} \\ \alpha_{j+1} \end{bmatrix} = B^{-1}(Y_j, A_j, \alpha_j) F(Y_j, A_j, \alpha_j) + \begin{bmatrix} Y_j \\ A_j \\ \alpha_j \end{bmatrix} \quad (1)$$

where the function F represents three functions $f_1$, $f_2$ and $f_3$ based upon partial derivatives for Y, A and α respectively of the mean squared error $\epsilon^2$ given by:

$$\epsilon^2 = \sum_{i \in I} [y_i - Y - A \sin(\omega_o x_i - \alpha)]^2 \quad (2)$$

where $\omega_o$ is angular frequency and $x_i = (i-1)\Delta x$ with $\Delta x$ being the interval between data sample points and $B^{-1}$ is the inverse matrix of the partial derivatives evaluated at $Y_j$, $A_j$, and $=_j$; and I is an index set.

(iii) step (ii) is iterated until the following stopping rule is satisfied:

$$|\alpha_{j+1} - \alpha_j| + |A_{j+1} - A_j| + |Y_{j+1} - Y_j| < S, \quad (3)$$

where S is a deviation constant.

The fracture dip angle is determined from the estimated peak amplitude utilized in the last of the above mentioned iterations. The fracture dip direction is determined from the estimated phase angle utilized in the last of the above mentioned iterations.

DESCRIPTION OF THE PREFERRED EMBODIMENT

Figure 1:
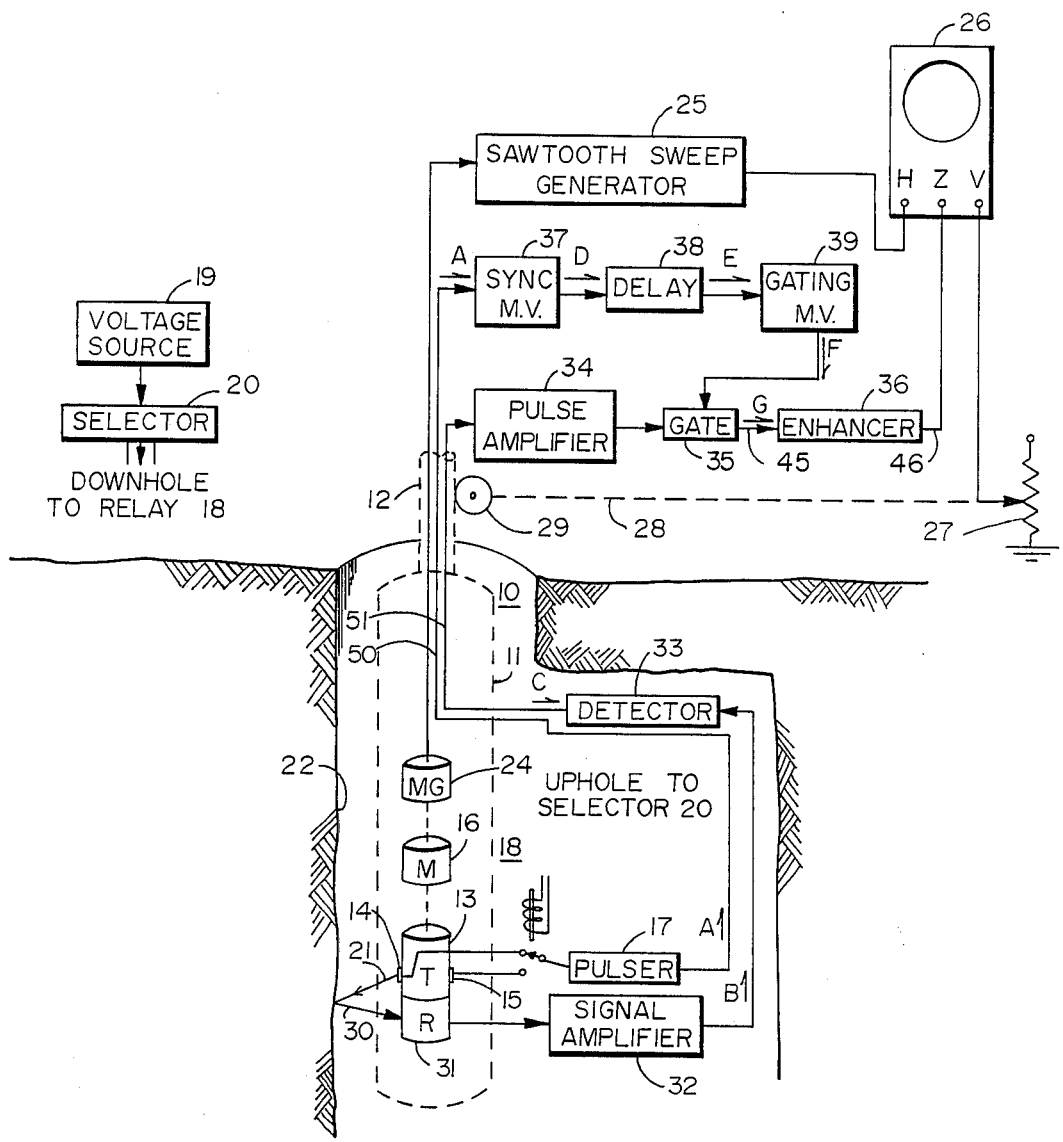
FIG. 1 illustrates a borehole televiewer logging system with which the signal enhancing technique of the present invention may be employed.

The formation fracture determination technique, as embodied in the present invention, is particularly adapted for use with borehole televiewer logging apparatus of the type illustrated in FIG. 1. For the purpose of illustrating the type of logging operation in which the formation fracture determination technique of the present invention best operates, a general description of the logging apparatus shown in FIG. 1 will be first presented, following which details of the formation fracture determination will be described.

Referring now to FIG. 1, there is illustrated one embodiment of a borehole televiewer logging system for carrying out density logging operations in a borehole 10. A borehole televiewer logging tool 11 is lowered into borehole 10 by means of a logging cable 12. Logging tool 11 comprises a transducer assembly 13 which acts as both a transmitter and receiver of acoustic energy. The beam of high frequency acoustic energy is rotated within the borehole to circularly scan the walls of the borehole. Such rotation is effected by means of motor 16. While it is understood that transducer assembly 13 comprises separate transmitter and receiver portions, a single transducer acting both as transmitter and receiver may be utilized. The transmitter portion of transducer assembly 13 consists of two transmitters 14 and 15 which are rotated about the borehole axis by means of motor 16. Pulser 17 is selectively applied to transmitters 14 and 15 by way of relay 18. Voltage is applied from voltage source 19 to relay 18 by way of selector 20. Selector 20 is a switch located uphole by which the polarity of the voltage to be applied to relay 18 is selected. A voltage polarity in one direction energizes relay 18 to connect the output of pulser 17 to transmitter 14. A polarity in the opposite direction energizes relay 18 to couple the output of pulser 17 to transducer 15. Hence, only one transmitter, either transmitter 14 or transmitter 15, will be operative at any given time, the frequency of the acoustic energy transmitted by way of beam path 21 toward the wall 22 of borehole 10 being determined by the selector switch 20 whose setting determines which transmitter is coupled to pulser 17. Pulser 17 may, for example, produce in the order of 2,000 excitation pulses per second. Thereupon, transmitter 14, for example, will produce an acoustic energy burst rate in the order of 2,000 bursts per second. A suitable frequency of the pulses of each acoustic energy burst may be, for example, 2 megahertz.

Logging tool 11 also includes a magnetometer 24, mounted for rotation with the logging tool 11, which produces an output pulse each time magnetic North is detected by said magnetometer during rotation. Such magnetometer output pulse is applied uphole to sawtooth sweep generator 25 which provides a horizontal sweep signal to the horizontal deflection plates of an electron beam display device 26 for horizontally driving an electron beam across the face of display device 26.

Each horizontal sweep of the electron beam across the display device 26 is displaced vertically from the start of the sweep to the end of the sweep in proportion to the vertical movement of the logging tool 11 within the borehole 10. Such displacement is provided by means of a potentiometer 27 which is coupled by electromechanical linkage 28 to a sheave 29 over which logging cable 12 passes. Vertical advancement of logging cable 12 along the borehole axis rotates sheave 29, such rotation causing electromechanical linkage 28 to vary the location of the wiper arm on potentiometer 27, thereby applying to the vertical deflection plates of display device 26 a voltage which is proportional to the depth of the logging tool within the borehole. The resulting picture displayed on display device 26 is a series of side-by-side, substantially horizontal beams, the start of each beam trace located at the vertical position on the face of the display device where the preceding beam trace terminated.

Reflected acoustic energy pulses 30 are received by a receiver portion 31 of transducer assembly 13, and signals representative of such reflections are applied to the Z-axis of display device 26 by way of a signal amplifier 32 and detector 33, located downhole, and a pulse amplifier 34, gate 35, and enhancer 36 located on the surface of the earth. Such input to the Z-input terminal of display device 26 serves to intensity modulate the electron beam in accordance with the amplitudes of the reflection signals.

Ordinary logging cables are not suitable for transmission of high frequency signals, such as 2 megahertz, to the surface; therefore, after being amplified by signal amplifier 32, the reflection signals are applied to detector 33 which generates a lower frequency signal in the form of the envelope of the reflection signals. Such lower frequency signals, preferably in the range of 20-50 kilohertz, can be transmitted to the surface over ordinary logging cable without appreciable signal loss. The output of detector 33 is applied to the input of pulse amplifier 34 by means of conductor 51.

Pulser 17 also provides an output to a sync multivibrator 37, delay 38, and gating multivibrator 39. The output of gating multivibrator 39 is an indication of the time period between transmitted acoustic energy pulses and during which reflected acoustic energy pulses are expected to be received at receiver 31, such output being applied to gate 35 to allow reflecting signals to pass from pulse ampifier 34 through gate 35 and enhancer 36 to the modulating input of display device 26.

When pulser 17 generates an excitation pulse, a portion of this pulse cross-feeds into receiver 31. Also, when a sync pulse is generated by pulser 17 and sent uphole via conductor 50, a portion of the pulse cross-feeds into receiver conductor 51. To prevent these cross-feed signals from intensity modulating the electron beam of display device 26, gate 35 is open only during that portion of time during which reflected pulses are expected to be received from the walls of the borehole. Each time a sync pulse is received by sync multivibrator 37, it triggers into its unstable state for an output for a period of time almost as long as the time period between transmitted acoustic pulses. At the same time that the output of sync multivibrator 37 goes positive, a delay monostable multivibrator 38 is triggered into its unstable stage for a period of time ending just prior to the anticipated arrival time of a reflected pulse at receiver 31. As the trailing edge of the output of delay multivibrator 38 goes negative, a gating monostable multivibrator 39 is triggered into its unstable state to generate a positive-going output, which triggers gating multivibrator 39 to provide a signal to gate 35 to allow passage therethrough of only those signals representative of reflected pulses. Therefore, only the envelopes of the reflection signals pass through gate 35 to enhancer 36.

Figure 2:
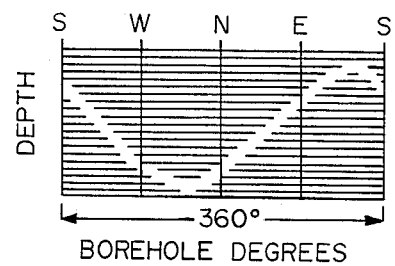
FIG. 2 illustrates a borehole televiewer log recorded by the system of FIG. 1 for a borehole intersected by a formation fracture.

These reflection signals represent two types of data. The amplitude of the reflection signal versus depth and azimuth, and the time of arrival of the reflection signal versus depth and azimuth. These reflection signals are presented on display device 26 as a two-dimensional, light-intensity function f(k,l) where k is a row (line) number on the display and l is a point (pixel) number on a line. The total number of lines in the image is L and the total number of pixels per line (equal to the total number of columns) is K. The value of f at spatial coordinates (k,l) of FIG. 2 is equal to the amplitude (or time of arrival) of the reflection signal received by the logging tool's receiver at azimuth k and depth l. This value f(k,l) will determine the intensity of the pixel (k,l) on the display. The monochrome image on the display consists of, for example, 512 horizontal lines by 512 pixels per line. This represents 512 scan lines from NORTH to NORTH (N—N) and 512 events per rotation of the borehole logging tool. Very often monochrome images are translated to color images, color being assigned to each pixel based on its intensity. For example, blue color is usually assigned to low intensities, red color to high intensities, and the remaining rainbow colors to the in-between intensities.

The ideal logging conditions for producing such monochrome or color images is with the logging tool oriented vertically in the center of a borehole where the cross-section is a circle. Images generated by the logging tool in such ideal conditions contain nothing but desired information about the borehole wall.

Figure 3:
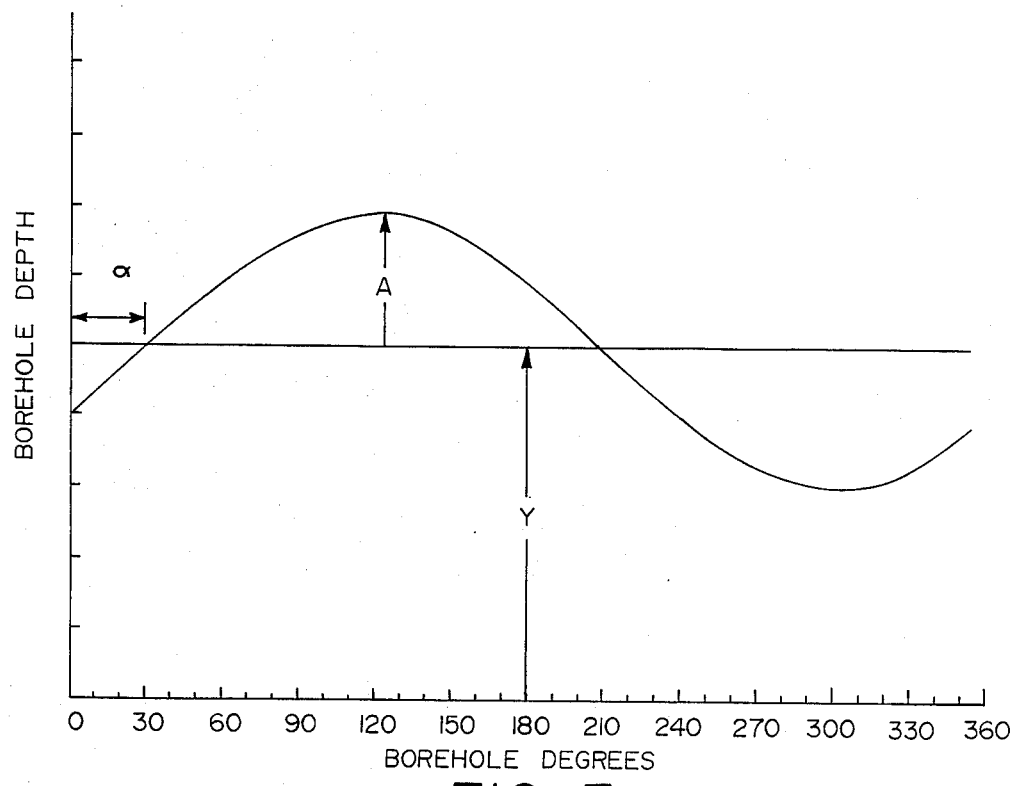
FIG. 3 depicts the sinusoidal format of a recorded formation fracture such as that of FIG. 2 with fracture location, sinusoid peak amplitude, and sinusoid phase angle being illustrated.

It is well known, as noted in U.S. Pat. Nos. 3,434,568 to Caldwell and 3,369,626 to Zemanek, Jr., that a formation fracture intersecting a borehole is recorded as a sinusoidal wave on a borehole televiewer log as illustrated in FIG. 2. In FIG. 2, the absence of reflections in the receiver signals causes absence of registration of the electron beam on the display device 26. This absence of registration outlines the fracture as it passes through the borehole. The frature dip angle is determined from the expression $$\theta = \tan^{-1}\frac{2A}{d}, \quad (4)$$

where $\theta$ = fracture dip angle
A = peak amplitude of the sinusoidal waveform
d = borehole diameter A BHTV log over an interval, such as that illustrated in FIG. 1, can be represented in a manner amenable to mathematical analysis as illustrated in FIG. 3. In FIG. 3, the sine wave log output is digitized and represented by a set of sample values $y_i$ given by $$y_i = Y + A \sin(\omega_o x_i - \alpha), \quad (5)$$

where $\alpha$ is a phase angle in radians, and Y is the location of the center of the fracture relative to some known point in the borehole.

The phase angle $\alpha$ is of interest since the dip direction (in degrees) is related to $\alpha$ (in radians) by $$\text{dip direction} = \frac{180\alpha}{\pi} - 90. \quad (6)$$

Figure 4:
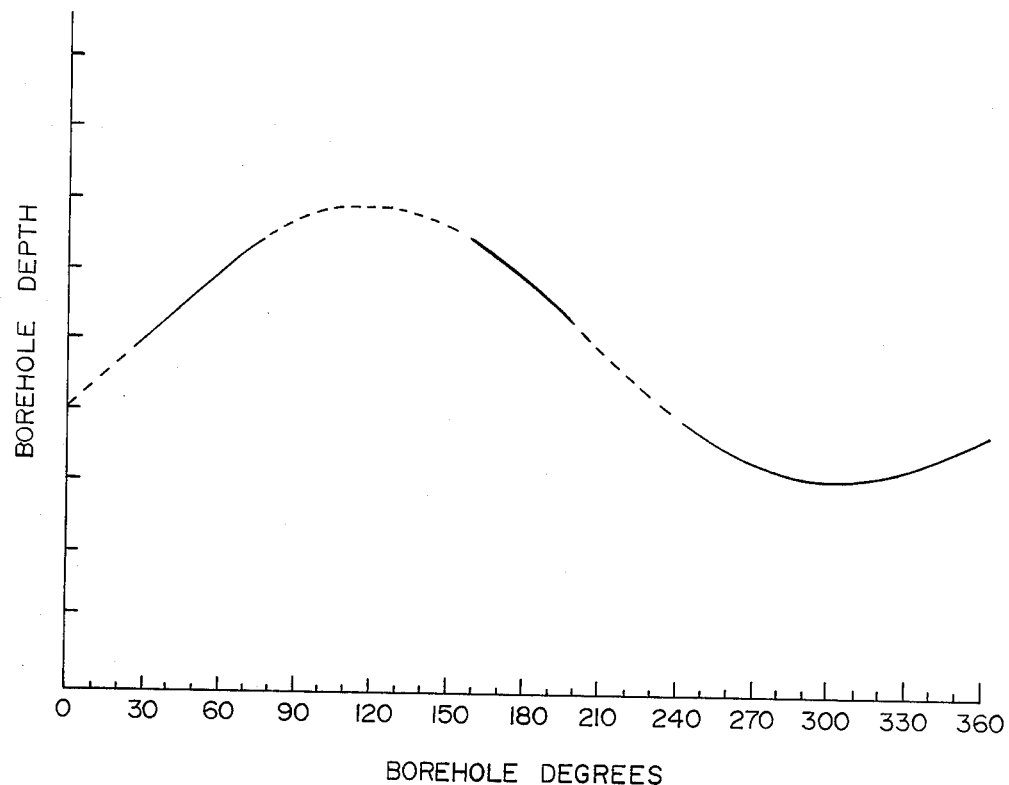
FIGS. 4–6 illustrate typical borehole data that would be recorded with missing data points and noisy data points.
Figure 5:
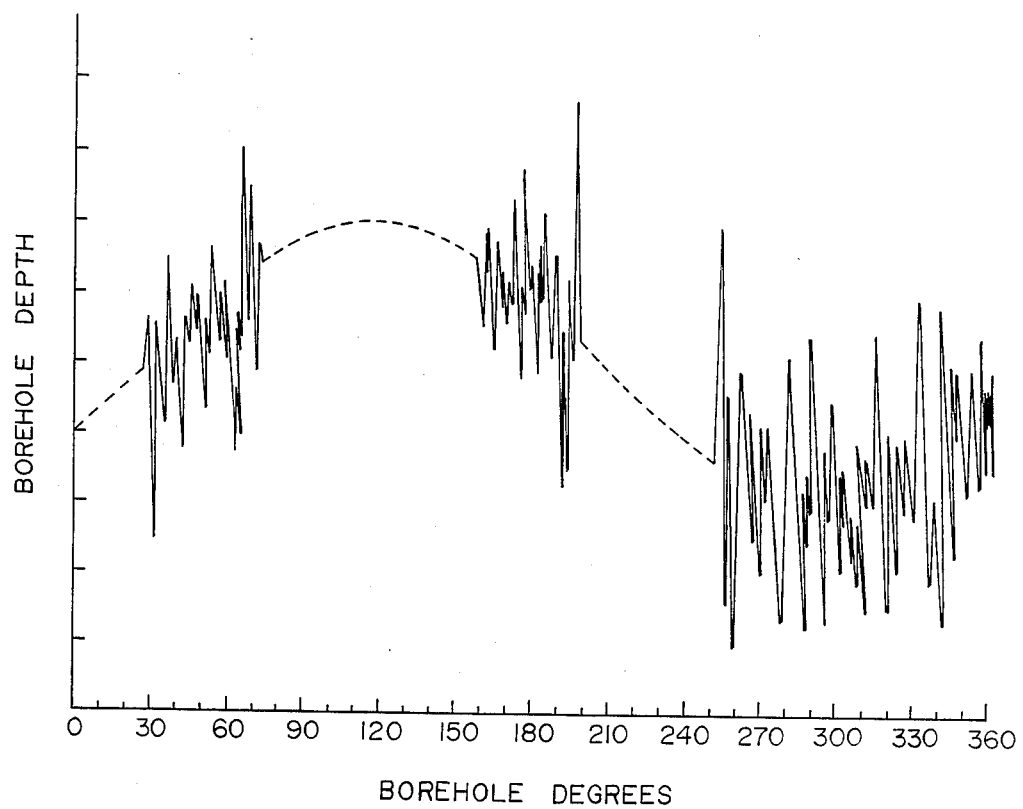

The angular frequency $\omega_o$ is determined from the requirement that $$\omega_o N = 2\pi, \quad (7)$$

where N is the number of digitizing points. The $x_i$ of equation (5) are consequently given by $$x_i = (i-1)\Delta x, \quad (8)$$

where $\Delta x$ is the interval between sample points. Inspection of equation (5) or FIG. 3 reveals that there are three unknown parameters Y, A, and $\alpha$. Whenever the entire waveform is present (as in FIG. 3), there are standard techniques such as Fourier analysis or visual analysis, which are commonly used to determine the unknown parameters. However, in many practical cases, a full waveform is not present. In these cases, an example of which is illustrated in FIG. 4 where the solid line represents the actual log output and the dashed line illustrates the missing data, the standard techniques will not yield accurate results. A more complicated situation arises when not only are portions of the data missing, but available data are noisy. This case is illustrated in FIG. 5.

Figure 6:
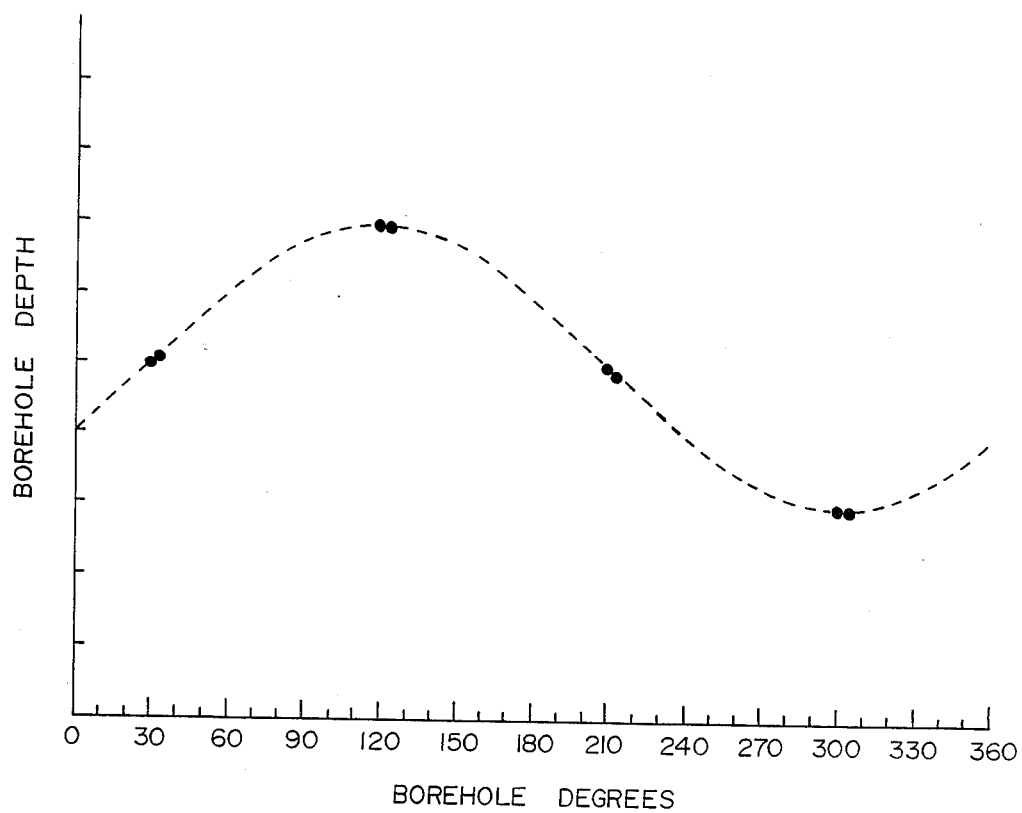

Since the standard techniques will not provide accurate results in the missing and/or noisy data cases, the fracture determination technique of the present invention is required. Before presenting this fracture determination technique, it is of interest to note that a standard four-arm dipmeter produces eight tracks of data; two tracks from each of the four arms. Whenever these pads cross bedding planes or in some cases fluid filled fractures, the electrical signals recorded are similar in nature to the missing data signal from a borehole televiewer logging tool. In fact, the dipmeter case is equivalent mathematically to an extreme borehole televiewer missing data case, in which only eight data points are available to determine the parameters Y, A and $\alpha$. This dipmeter example is illustrated in FIG. 6. FIG. 6 depicts how the resistivity response of the eight tracks of a four-arm dipmeter crossing a bedding plane at an angle to the wellbore are related to a sinusoidal curve. The dashed curve shows the sine wave that would have been recorded if resistivity were measured continuously around the borehole. The eight black circles in FIG. 6 correspond to "kicks" on the pad resistivity curves and produce a data set that is mathematically equivalent to a borehole televiewer data set consisting of eight data points; and consequently, the fracture determination technique of the present invention applies equally well to both the borehole televiewer and dipmeter. Additionally, data from a formation microresistivity logging tool are very similar to the borehole televiewer data, and application of the fracture determination technique of the present invention applies equally well to the formation micro scanner data.

The fracture determination technique of the present invention processes data (borehole televiewer, formation microresistivity logging tool, or dipmeter) from a data set consisting of pairs of data points.

$$(y_i, x_i), i \in I, \quad (9)$$

where I is the index set for which data exists. In the case of no missing data, the set I would consist of the integers from 1 to N. In the case of missing data points, the set I would not contain those integers corresponding to points for which no data are available. For the dipmeter case, index set I would contain only eight values corresponding to the eight tracks.

From this recorded borehole data, an interval of the borehole intersected by a formation fracture is identified from a plurality of unconnected data segments in sinusoidal format as discussed above in connection with FIGS. 4 and 5. A determination is then carried out for the location Y of the center of the fracture relative to the borehole, for the peak amplitude A of the data with respect to such sinusoidal format, and for the phase angle $\alpha$ of the data with respect to such sinusoidal format as discussed above in conjunction with FIG. 3. Initially, estimates are made for location Y, peak amplitude A, and phase angle $\alpha$. These estimates are employed in the following algorithm to determine an approximate solution for location Y, peak amplitude A, and phase angle $\alpha$ by means of an iterative process:

$$\begin{bmatrix} Y_{j+1} \\ A_{j+1} \\ \alpha_{j+1} \end{bmatrix} = B^{-1}(Y_j, A_j, \alpha_j) F(Y_j, A_j, \alpha_j) + \begin{bmatrix} Y_j \\ A_j \\ \alpha_j \end{bmatrix} \quad (10)$$

where the function F represents three functions $f_1$, $f_2$ and $f_3$ based upon partial derivatives for Y, A and $\alpha$ respectively of the mean squared error $\epsilon^2$ of eq. (5) given by:

$$\epsilon^2 = \sum_{i \in I} [y_i - Y - A \sin(\omega_o x_i - \alpha)]^2 \tag{11}$$

where $\omega_o$ is angular frequency, and $x_i = (i-1)\Delta x$ with $\Delta x$ being the interval between data sample points and $B^{-1}$ is the inverse matrix of such partial derivatives evaluated at $Y_j$, $A_j$ and $\alpha_j$. The algorithm of eq. (10) is iterated until the following stopping rule is satisfied:

$$|\alpha_{j+1} - \alpha_j| + |A_{j+1} - A_j| + |Y_{j+1} - Y_j| < 2, \tag{12}$$

where S is a present set deviation constant of about $10^{-5}$ or smaller.

When the stopping rule of eq. (12) is satisfied in accordance with the selected deviation constant, the values of location Y, peak amplitude A, and phase angle $\alpha$ determined from the last iterative step are utilized in accordance with eqs. (4) and (6) to determine formation dip angle and direction respectively.

Determination of the algorithm of eq. (10) of the present invention for use in fracture dip and direction determination is accomplished by minimizing the mean-squared error derived from eq. (11).

The parameter values Y, A, and $\alpha$ of eq. (11) are:

$$f_1(Y,A,\alpha) \stackrel{\Delta}{=} \frac{\partial \epsilon^2}{\partial y} = 0, \tag{13}$$

$$f_2(Y,A,\alpha) \stackrel{\Delta}{=} \frac{\partial \epsilon^2}{\partial A} = 0, \text{ and} \tag{14}$$

$$f_3(Y,A,\alpha) \stackrel{\Delta}{=} \frac{\partial \epsilon^2}{\partial \alpha} = 0, \tag{15}$$

where the functions $f_1$, $f_2$ and $f_3$ are as defined above. Carrying out the operations in the above equations yields for tthe functions the expressions:

$$f_1(Y,A,\alpha) = -\sum_{i \in I}[y_i - Y - A\sin(\omega_o x_i - \alpha)], \tag{16}$$

$$f_2(Y,A,\alpha) = -\sum_{i \in I}[y_i - Y - A\sin(\omega_o x_i - \alpha)]\sin(\omega_o x_i - \alpha), \tag{17}$$

and $$f_3(Y,A,\alpha) = A\sum_{i \in I}[y_i - Y - A\sin(\omega_o x_i - \alpha)]\cos(\omega_o x_i - \alpha). \tag{18}$$

Now, define the vector F by $$F = \begin{bmatrix} f_1 \\ f_2 \\ f_3 \end{bmatrix}, \tag{19}$$

and define the values $\hat{Y}$, $\hat{A}$, and $\hat{\alpha}$ as the values of $\hat{Y}$, $\hat{A}$, and $\hat{\alpha}$, which results in the functions $f_1$, $f_2$ and $f_3$ being equal to zero.

Solution of eqs. (16)–(18) is complicated by their obvious nonlinear nature and will, therefore, be accomplished by iteration. In order to do this, eq. (19) is expanded in a first-order Taylor series about some point $(Y,A,\alpha)$ that is near the true solution and then iterating to determine $\hat{Y}$, $\hat{A}$, and $\hat{\alpha}$. The required first-order Taylor expansion of F is $$F(\hat{Y},\hat{A},\hat{\alpha}) \approx F(Y,A,\alpha) + \begin{vmatrix} \frac{\partial f_1}{\partial y} & \frac{\partial f_1}{\partial A} & \frac{\partial f_1}{\partial \alpha} \\ \frac{\partial f_2}{\partial y} & \frac{\partial f_2}{\partial A} & \frac{\partial f_2}{\partial \alpha} \\ \frac{\partial f_3}{\partial y} & \frac{\partial f_3}{\partial A} & \frac{\partial f_3}{\partial \alpha} \end{vmatrix} \begin{vmatrix} Y - \hat{Y} \\ A - \hat{A} \\ \alpha - \hat{\alpha} \end{vmatrix} \tag{20}$$

$$= F(Y,A,\alpha) + B(Y,A,\alpha) \begin{vmatrix} Y - \hat{Y} \\ A - \hat{A} \\ \alpha - \hat{\alpha} \end{vmatrix}, \tag{21}$$

where B is the (3×3) matrix of partial derivatives evaluated at $(Y,A,\alpha)$. From eq. (19), it is seen that at the point $(Y,A,\alpha)$ F is identically zero. Using this fact, eq. (21) can be written as $$\begin{bmatrix} 0 \\ 0 \\ 0 \end{bmatrix} = F(Y,A,\alpha) + B(Y,A,\alpha) \begin{bmatrix} Y - \hat{Y} \\ A - \hat{A} \\ \alpha - \hat{\alpha} \end{bmatrix}, \tag{22}$$

from which it follows that $$\begin{vmatrix} \hat{Y} \\ \hat{A} \\ \hat{\alpha} \end{vmatrix} = B^{-1}(Y,A,\alpha)F(Y,A,\alpha) + \begin{vmatrix} Y \\ A \\ \alpha \end{vmatrix}, \tag{23}$$

where $B^{-1}$ denotes the matrix inverse of B.

The approximate solution for (Y, A and $\alpha$) suggests than an iterative scheme be employed. This scheme begins with an initial estimate $(y_o, A_o, \alpha_o)$ and uses eq. (10) iteratively.

One example of the power of the fracture determination algorithm of the present invention is its application to the dashed sine wave curve of FIG. 4 with the following parameters:

$$y_i = 2 \sin(\omega_o x_i - 30°) + 5. \tag{24}$$

The solid segments represent the available data to be processed. Using these data, the algorithm computed $$y_i = 1.99 \sin(\omega_0 x_i - 29.99°) + 5, \tag{25}$$

which is in close agreement with the actual values.

Consider next the data from a four arm dipmeter as illustrated in FIG. 6. In this case, the entire data set consists of eight points as indicated by the dots on the actual dashed curve. The eight data points simulate the event recorded by the eight dipmeter tracks from the curve $$y_i = 2 \sin(\omega_o x_i - 30°) + 5. \tag{26}$$

Applying the algorithm to this case yields for the computed values the curve $$y_i = 2 \sin(\omega_o x_i - 30°) + 5, \tag{27}$$

which agrees exactly with the actual values.

Next, consider the noisy and missing borehole televiewer data example of FIG. 5 where again the dashed line depicts the true sine wave. The equation for the actual sine wave is $$y_i = 2 \sin(\omega_o x_i - 30°) + 5, \tag{28}$$

and the values computed using the algorithm are $$y_i = 1.85 \sin(\omega_o x_i - 34.8°) + 4.87, \quad (29)$$

and once again, the computed values are in very close agreement to the actual values.

In all of the above examples, the computed values of A and α would be used to determine the dip angle and dip direction from eqs. (4) and (6), respectively. The close comparison of the computed values to the actual values guarantees that the calculated values of dip angle and dip direction will be in close agreement with the actual values. The above examples clearly demonstrate the power of the fracture determination algorithm for missing and noisy data. If the data set is not noisy or is free of gaps, then the computed parameter values are in even closer agreement with the actual parameter values that are indicated by the examples presented above. A data set from an actual borehole televiewer log is illustrated in solid lines in FIG. 7. For this data, the sine wave is computed $$y = 5.346 + 3.803 \sin(\omega_o x - 210°) \quad (30)$$

Dip angle and dip direction corresponding to the A and α contained in Eq. (30) were computed and found to be:

$$\theta = \tan^{-1} \frac{2A}{d} = 83.4°, \quad (31)$$

and $$\text{dip direction} = \frac{180\alpha}{\pi} - 90 = 59.98° \text{ E of S} \quad (32)$$

Figure 7:
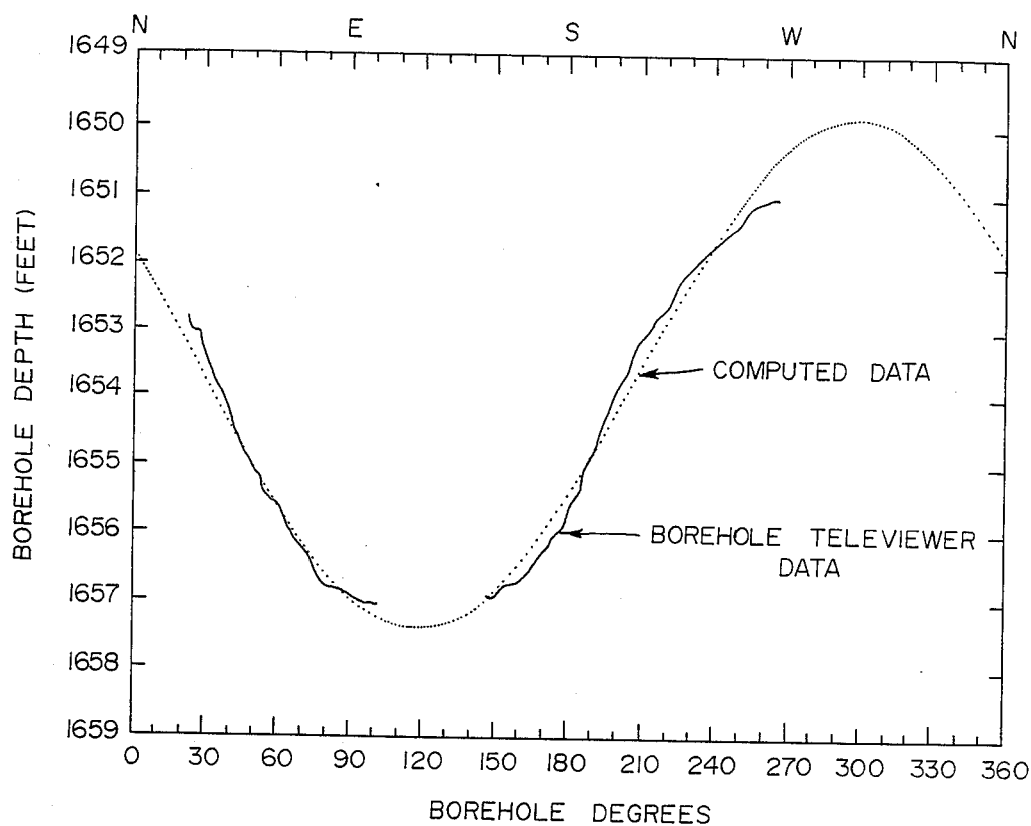
FIGS. 7–9 illustrate the application of the fracture determination technique of the present invention to actual field data recorded by differing borehole logging systems

Data values based on such dip angle and direction determination are illustrated in dashed lines in FIG. 7 and are in close agreement with the actual data values.

Figure 8:
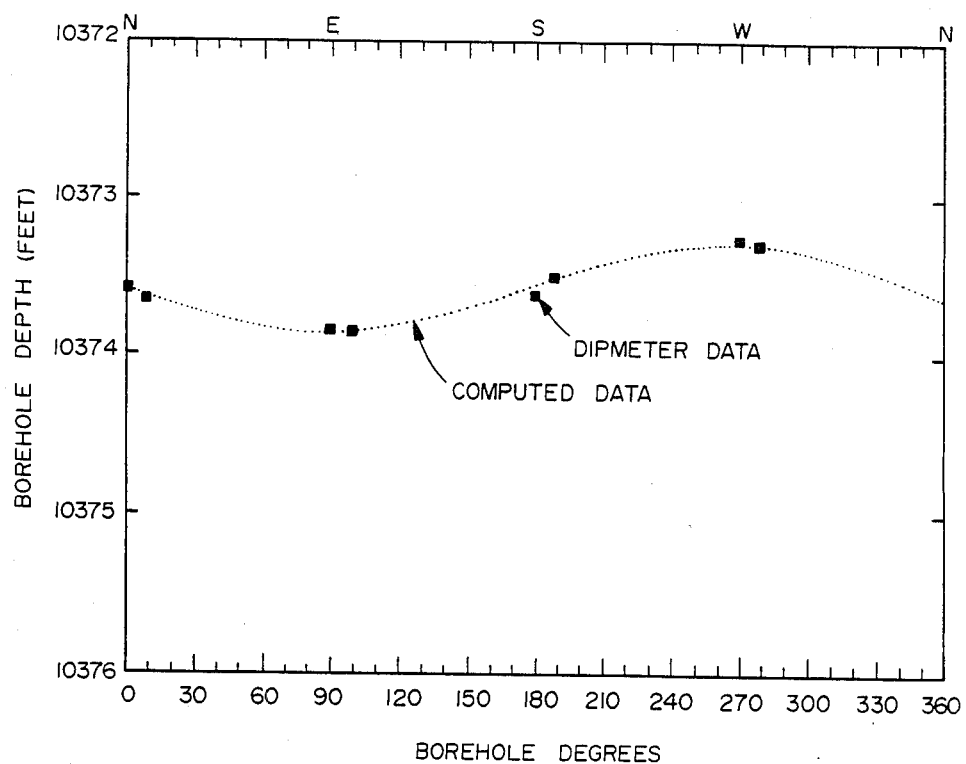

An example of actual four arm dipmeter data is illustrated in FIG. 8. The events of the tracks corresponding to the four pads crossing the same bedding plane are indicated by the square points. The square points provide eight data points from which the sine wave $$y = 2.4177 + 0.286 \sin(\omega_o x - 176.56°) \quad (33)$$

is computed by the fracture determination algorithm. Dip angle and dip direction corresponding to the A and α contained in eq. (33) were computed and found to be $$\theta = 21°, \text{ and} \quad (34)$$

$$\text{dip direction} = 1° \text{ W of N,} \quad (35)$$

after correction for borehole deviation. There is close agreement between the actual data (square points) and the computed data (dotted line) in FIG. 8.

Even though the fracture determination algorithm has been applied to four arm dipmeter data, it will be apparent that it can be applied to dipmeter data from a tool having any number of measuring points as well as utilizing electrical, acoustic or other types of data.

Figure 9:
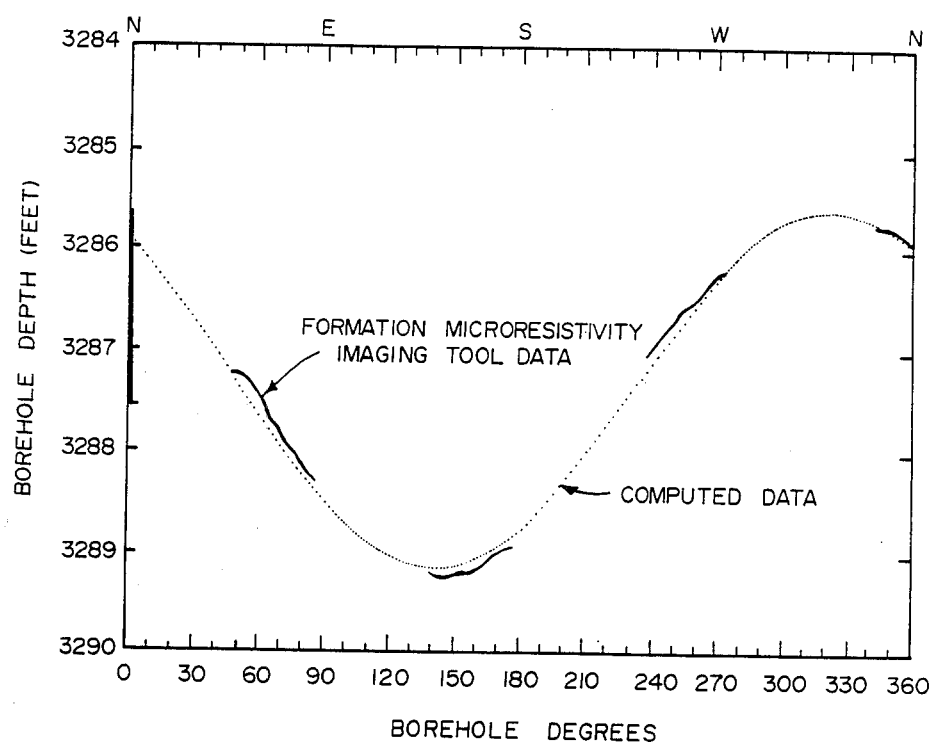

A final example applies the algorithm to a formation microresistivity imaging tool. FIG. 9 shows the actual data segments (solid lines). For these data segments the sine wave $$y = 2.64 + 1.841 \sin(\omega_o x - 232.94°). \quad (36)$$

Dip angle and dip direction corresponding to the A and α contained in Eq. (36) were computed and found to be:

$$\theta = 79.74°, \quad (37)$$

and $$\text{dip direction} = 37.06° \text{ E of S.} \quad (38)$$

Again there is close agreement between the actual data segments (solid lines) and the computed data (dotted lines) in FIG. 8.

What is claimed is:

1. A method for determining the dip and direction of a formation fracture intersecting a borehole, comprising the steps of:
   (a) conducting a survey of formation density surrounding a borehole and intersected by a formation fracture,
   (b) recording a borehole log of data obtained during said survey,
   (c) identifying from said borehole log the interval of said borehole intersected by said formation fracture,
   (d) determining the location Y of the center of the fracture relative to the borehole, the peak amplitude A of the data with respect to said fracture location, and the phase angle α of the data with respect to said fracture location as follows:
      (i) estimating initial values for said location Y, amplitude A and phase angle α respectively,
      (ii) solving the following teration algorithm using said initial values of location Y, amplitude A and phase angle α, $$\begin{bmatrix} Y_{j+1} \\ A_{j+1} \\ \alpha_{j+1} \end{bmatrix} = B^{-1}(Y_j, A_j, \alpha_j) F(Y_j, A_j, \alpha_j) + \begin{bmatrix} Y_j \\ A_j \\ \alpha_j \end{bmatrix}$$

where the function F represents three functions $f_1$, $f_2$ and $f_3$ based upon partial derivatives for Y, A and α respectively of the mean squared error $\epsilon^2$ given by:

$$\epsilon^2 = \sum_{i \in I} [y_i - Y - A \sin(\omega_o x_i - \alpha)]^2$$

where $\omega_o$ is angular frequency, and $x_i = (i-1)\Delta x$ with $\Delta x$ being the interval between data sample points and $B^{-1}$ is the inverse matrix of such partial derivatives evaluated at $Y_j$, $A_j$ and $\alpha_j$,
      (iii) iterating through step (ii) until the following stopping rule is satisfied:

$$|\alpha_{j+1} - \alpha_j| + |A_{j+1} - A_j| + |Y_{j+1} - Y_j| < S,$$

where S is a deviation constant,
   (e) determining fracture dip angle from the estimated peak amplitude utilized in the last iteration of step (d) and
   (f) determining fracture dip direction from the estimated phase angle α utilized in the last iteration of step (d).

2. The method of claim 1 where (i) the function F is determined as follows:

$$F = \begin{bmatrix} f_1 \\ f_2 \\ f_3 \end{bmatrix},$$

wherein:

$$f_1(Y,A,\alpha) = - \sum_{i \in I} [y_i - Y - A \sin(\omega_o x_i - \alpha)],$$

$$f_2(Y,A,\alpha) = - \sum_{i \in I} [y_i - Y - A \sin(\omega_o x_i - \alpha)]\sin(\omega_o x_i - \alpha),$$

and $$f_3(Y,A,\alpha) = A \sum_{i \in I} [y_i - Y - A \sin(\omega_o x_i - \alpha)]\cos(\omega_o x_i - \alpha),$$

(ii) the Matrix B is determined as follows:

$$\begin{vmatrix} \frac{\partial f_1}{\partial y} & \frac{\partial f_1}{\partial A} & \frac{\partial f_1}{\partial \alpha} \\ \frac{\partial f_2}{\partial y} & \frac{\partial f_2}{\partial A} & \frac{\partial f_2}{\partial \alpha} \\ \frac{\partial f_3}{\partial y} & \frac{\partial f_3}{\partial A} & \frac{\partial f_3}{\partial \alpha} \end{vmatrix}$$

3. The method of claim 1 wherein said deviation constant S is $10^{-5}$ or smaller.

4. The method of claim 1 wherein said algorithm is applied to a plurality of data points in spaced-apart sinusoidal format on said borehole log.

5. The method of claim 1 wherein said algorithm is applied to a plurality of unconnected data point segments in sinusoidal format on said borehole log.

6. The method of claim 1 wherein said algorithm is applied to discrete data tracks in sinusoidal format on said borehole log.

* * * * *

UNITED STATES PATENT AND TRADEMARK OFFICE
CERTIFICATE OF CORRECTION

PATENT NO. : 4,780,857
DATED : October 25, 1988
INVENTOR(S) : W.D. Lyle et al

It is certified that error appears in the above-identified patent and that said Letters Patent is hereby corrected as shown below:

Column 2, line 17, delete "=", and insert -- $\alpha$ --.

Column 7, line 14, delete "2", and insert --S--.

Column 7, line 59, delete "$\ddot{\alpha}$" and insert --$\hat{\alpha}$--.

Column 7, line 59, delete "$\hat{Y}$, $\hat{A}$" second occurrance and insert --Y, A--.

Column 7, line 60, delete "$\hat{\alpha}$" and insert --$\alpha$--.

Column 10, line 34, delete "teration" and insert --iteration--.

Signed and Sealed this

Twenty-fifth Day of April, 1989

Attest:

DONALD J. QUIGG

*Attesting Officer*  *Commissioner of Patents and Trademarks*